United States Patent
Deshpande

(10) Patent No.: US 10,820,043 B2
(45) Date of Patent: *Oct. 27, 2020

(54) METHOD FOR DECODING A SERVICE GUIDE

(71) Applicant: Sharp Kabushiki Kaisha, Sakai, Osaka (JP)

(72) Inventor: Sachin G. Deshpande, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/511,373

(22) Filed: Jul. 15, 2019

(65) Prior Publication Data

US 2019/0342605 A1    Nov. 7, 2019

Related U.S. Application Data

(63) Continuation of application No. 15/874,911, filed on Jan. 19, 2018, now Pat. No. 10,405,029, which is a continuation of application No. 15/505,633, filed as application No. PCT/JP2015/004848 on Sep. 24, 2015, now Pat. No. 9,918,120.

(60) Provisional application No. 62/059,704, filed on Oct. 3, 2014, provisional application No. 62/068,131, filed on Oct. 24, 2014.

(51) Int. Cl.
*H04N 21/434* (2011.01)
*H04N 21/462* (2011.01)
*H04N 21/858* (2011.01)
*H04H 60/72* (2008.01)

(52) U.S. Cl.
CPC ........ *H04N 21/4345* (2013.01); *H04H 60/72* (2013.01); *H04N 21/462* (2013.01); *H04N 21/8586* (2013.01)

(58) Field of Classification Search
CPC . H04N 21/278; H04N 21/431; H04N 21/4332
USPC ..................................... 725/39, 51
See application file for complete search history.

(56) References Cited

U.S. PATENT DOCUMENTS

2010/0287588 A1* 11/2010 Cox ................ H04N 21/26283
725/40

OTHER PUBLICATIONS

Deshpande, "Method for Decoding a Service Guide", U.S. Appl. No. 15/874,911, filed Jan. 19, 2018.

* cited by examiner

*Primary Examiner* — Dominic D Saltarelli
(74) *Attorney, Agent, or Firm* — Keating & Bennett, LLP

(57) ABSTRACT

The invention is: A method for decoding a service guide associated with a video bitstream comprising: (a) receiving a content fragment within the service guide, (b) receiving a name element within the content fragment, (c) receiving a description element within the content fragment and (d) decoding the service guide.

1 Claim, 15 Drawing Sheets

| Name | Type | Category | Cardinality | Description | Data Type |
|---|---|---|---|---|---|
| SpeechInfoURI | E2 | NM/ TM | 0..1 | The URI address where SpeechInfo object for parent Name element is acquired.<br><br>Speech file may be encoded in SSML format (http://www.w3.org/TR/speech-synthesis11/) or similar types of mark up languages.<br><br>Contains following attribute:<br><br>content-type | anyURI |
| content-type | A | NM/ TM | 0..1 | Content-type (or MIME type) of SpeechInfo object referenced by SpeechInfoURI. | String |
| SpeechInfo | E2 | NM/ TM | 0..1 | Embedded SpeechInfo object for parent Name element.<br><br>Contains following attribute:<br><br>content-type | String |
| content-type | A | NM/ TM | 1 | Content-type (or MIME type) of SpeechInfo object. | String |

| Name | Type | Category | Cardinality | Description | Data Type |

| Name | Type | Category | Cardinality | Description | Data Type |
|---|---|---|---|---|---|
| SpeechInfoURI | E2 | NM/ TM | 0..1 | The URI address where SpeechInfo object for parent Name element is acquired. Speech file may be encoded in SSML format (http://www.w3.org/TR/speech-synthesis11/) or similar types of mark up languages. Contains following attribute: content-type | anyURI |
| content-type | A | NM/ TM | 0..1 | Content-type (or MIME type) of SpeechInfo object referenced by SpeechInfoURI. | String |
| SpeechInfo | E2 | NM/ TM | 0..1 | Embedded SpeechInfo object for parent Name element. Contains following attribute: content-type | String |
| content-type | A | NM/ TM | 1 | Content-type (or MIME type) of SpeechInfo object. | String |

FIG. 5

| Name | Type | Category | Cardinality | Description | Data Type |
|---|---|---|---|---|---|
| Name | E1 | NM/ TM | 1..N | Name of the 'Content' fragment, possibly in multiple languages. The language is expressed using built-in XML attribute 'xml:lang' with this element. | string |
| SpeechInfoURI | E2 | NM/ TM | 0..1 | The URI address where SpeechInfo object for parent Name element is acquired.<br><br>Speech file may be encoded in SSML format (http://www.w3.org/TR/speech-synthesis11/) or similar types of mark up languages.<br><br>Contains following attribute:<br><br>content-type | anyURI |
| content-type | A | NM/ TM | 0..1 | Content-type (or MIME type) of SpeechInfo object referenced by SpeechInfoURI. | string |
| SpeechInfo | E2 | NM/ TM | 0..1 | Embedded SpeechInfo object for parent Name element.<br><br>Contains following attribute:<br><br>content-type | String |
| content-type | A | NM/ TM | 1 | Content-type (or MIME type) of SpeechInfo object. | string |
| Description | E1 | NM/ TM | 0..N | Description, possibly in multiple languages. The language is expressed using built-in XML attribute 'xml:lang' with this element. | String |
| SpeechInfoURI | E2 | NM/ TM | 0..1 | The URI address where SpeechInfo object for parent Name element is acquired.<br><br>Speech file may be encoded in SSML format (http://www.w3.org/TR/speech-synthesis11/) or similar types of mark up languages.<br><br>Contains following attribute:<br><br>content-type | anyURI |
| content-type | A | NM/ TM | 0..1 | Content-type (or MIME type) of SpeechInfo object referenced by SpeechInfoURI. | string |
| SpeechInfo | E2 | NM/ TM | 0..1 | Embedded SpeechInfo object for parent Name element.<br><br>Contains following attribute:<br><br>content-type | String |
| content-type | A | NM/ TM | 1 | Content-type (or MIME type) of SpeechInfo object. | string |
| Description | E1 | NM/ TM | 0..N | Description, possibly in multiple languages. The language is expressed using built-in XML attribute 'xml:lang' with this element. | String |

FIG. 5A

| Name | Type | Category | Cardinality | Description | Data Type |
|---|---|---|---|---|---|
| SpeechInfoURI | E2 | NM/ TM | 0..1 | The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| content-type | A | NM/ TM | 0..1 | Content-type (or MIME type) of SpeechInfo object referenced by SpeechInfoURI. | String |
| content-enc | A | NM/ TM | 0..1 | Content encoding of SpeechInfo object referenced by SpeechInfoURI. | String |
| SpeechInfo | E2 | NM/ TM | 0..1 | Embedded SpeechInfo object for parent Name element. Contains following attribute: content-type content-enc | String |
| content-type | A | NM/ TM | 1 | Content-type (or MIME type) of SpeechInfo object. | String |
| content-enc | A | NM/ TM | 1 | Content encoding of SpeechInfo object. | String |

FIG. 9

| Name | Type | Category | Cardinality | Description | Data Type |
|---|---|---|---|---|---|
| Name | E1 | NM/ TM | 1..N | Name of the Content' fragment, possibly in multiple languages. The language is expressed using built-in XML attribute 'xml:lang' with this element. | string |
| SpeechInfoURI | E2 | NM/ TM | 0..1 | The URI address where SpeechInfo object for parent Name element is acquired.<br><br>Speech file may be encoded in SSML format (http://www.w3.org/TR/speech-synthesis11/) or similar types of mark up languages.<br><br>Contains following attribute:<br><br>content-type<br><br>content-enc | anyURI |
| content-type | A | NM/ TM | 0..1 | Content-type (or MIME type) of SpeechInfo object referenced by SpeechInfoURI. | string |
| content-enc | A | NM/ TM | 0..1 | Content encoding of SpeechInfo object referenced by SpeechInfoURI. | string |
| SpeechInfo | E2 | NM/ TM | 0..1 | Embedded SpeechInfo object for parent Name element.<br><br>Contains following attribute:<br><br>content-type<br><br>content-enc | string |
| content-type | A | NM/ TM | 1 | Content-type (or MIME type) of SpeechInfo object. | string |
| content-enc | A | NM/ TM | 1 | Content encoding of SpeechInfo object. | string |
| Description | E1 | NM/ TM | 0..N | Description, possibly in multiple languages. The language is expressed using built-in XML attribute 'xml:lang' with this element. | string |
| SpeechInfoURI | E2 | NM/ TM | 0..1 | The URI address where SpeechInfo object for parent Name element is acquired.<br><br>Speech file may be encoded in SSML format (http://www.w3.org/TR/speech-synthesis11/) or similar types of mark up languages.<br><br>Contains following attribute:<br><br>content-type<br><br>content-enc | anyURI |
| content-type | A | NM/ TM | 0..1 | Content-type (or MIME type) of SpeechInfo object referenced by SpeechInfoURI. | string |
| content-enc | A | NM/ TM | 0..1 | Content encoding of SpeechInfo object referenced by SpeechInfoURI. | string |
| SpeechInfo | E2 | NM/ TM | 0..1 | Embedded SpeechInfo object for parent Name element.<br><br>Contains following attribute:<br><br>content-type<br><br>content-enc | string |
| content-type | A | NM/ TM | 1 | Content-type (or MIME type) of SpeechInfo object. | string |
| content-enc | A | NM/ TM | 1 | Content encoding of SpeechInfo object. | string |

FIG. 9A

METHOD FOR DECODING A SERVICE GUIDE

TECHNICAL FIELD

The present disclosure relates generally to a service guide.

BACKGROUND ART

A broadcast service is capable of being received by all users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using both a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

SUMMARY OF INVENTION

Technical Problem

In addition to more traditional stationary receiving devices, mobile communication devices are likewise configured to support such services. Such configured mobile devices have facilitated users to use such services while on the move, such as mobile phones. An increasing need for multimedia services has resulted in various wireless/broadcast services for both mobile communications and general wire communications. Further, this convergence has merged the environment for different wire and wireless broadcast services.

Open Mobile Alliance (OMA), is a standard for interworking between individual mobile solutions, serves to define various application standards for mobile software and Internet services. OMA Mobile Broadcast Services Enabler Suite (OMA BCAST) is a specification designed to support mobile broadcast technologies. The OMA BCAST defines technologies that provide IP-based mobile content delivery, which includes a variety of functions such as a service guide, downloading and streaming, service and content protection, service subscription, and roaming.

Solution to Problem

According to the present invention, there is provided a method for decoding a service guide associated with a video bitstream comprising:
(a) receiving a content fragment within the service guide;
(b) receiving a name element within the content fragment, wherein the name element is an extended name element which includes sub-elements to indicate name and phonetic information about the name element, the name element contains the sub-elements including a first SpeechInfoURI element and a first SpeechInfo element, and the name element includes a first text attribute which is a name of a service with a data type of string,
wherein the first SpeechInfoURI element is a URI address where a first SpeechInfo object for the name element is acquired, and the first SpeechInfoURI element includes a first content-type attribute and a first content-enc attribute, wherein the first content-type is a content-type of the first SpeechInfo object referenced by the first SpeechInfoURI element and the first content-enc is a content encoding of the first SpeechInfo object referenced by the first SpeechInfoURI element, and
wherein the first SpeechInfo element is embedded speech information object for the name element, and the first Speech Info element includes a second content-type attribute and a second content-enc attribute, wherein the second content-type is a content-type of the first SpeechInfo object and the second content-enc is a content encoding of the second SpeechInfo object,
(c) receiving a description element within the content fragment;
wherein the description element is an extended description element which includes sub-elements to indicate description and phonetic information about the description element, the description element contains the sub-elements including a second SpeechInfoURI element and a second SpeechInfo element, and the description element includes a second text attribute which is a description of the service with a data type of string,
wherein the second SpeechInfoURI element is a URI address where a second SpeechInfo object for the description element is acquired, and the second SpeechInfoURI element includes a third content-type attribute and a third content-enc attribute, wherein the third content-type is a content-type of the third SpeechInfo object referenced by the second SpeechInfoURI element and the third content-enc is a content encoding of the third SpeechInfo object referenced by the second SpeechInfoURI element, and
wherein the second SpeechInfo element is embedded speech information object for the description element, and the second SpeechInfo element includes a fourth content-type attribute and a fourth content-enc attribute, wherein the fourth content-type is a content-type of a fourth SpeechInfo object and the fourth content-enc is a content encoding of the fourth SpeechInfo object,
(d) decoding the service guide.

According to the present invention, there is provided a decoder for decoding a service guide associated with a video bitstream comprising:
a receiver configured to receive a content fragment within the service guide, a name element within the content fragment and a description element within the content fragment,
wherein the name element is an extended name element which includes sub-elements to indicate name and phonetic information about the name element, the name element contains the sub-elements including a first SpeechInfoURI element and a first SpeechInfo element, and the name element includes a first text attribute which is a name of a service with a data type of string,
wherein the first SpeechInfoURI element is a URI address where a first SpeechInfo object for the name element is acquired, and the first SpeechInfoURI element includes a first content-type attribute and a first content-enc attribute, wherein the first content-type is a content-type of the first SpeechInfo object referenced by the first SpeechInfoURI element and the first content-enc is a content encoding of the first SpeechInfo object referenced by the first SpeechInfoURI element, and
wherein the first SpeechInfo element is embedded speech information object for the name element, and the first Speech Info element includes a second content-type attribute and a second content-enc attribute, wherein the second content-type is a content-type of the first SpeechInfo object and the second content-enc is a content encoding of the second SpeechInfo object, wherein the description element is an extended description element which includes sub-elements to indicate description and phonetic information about the description element, the description element contains the sub-elements including a second SpeechInfoURI element and a second SpeechInfo element, and the description element includes a second text attribute which is a description of the service with a data type of string, wherein the second SpeechInfoURI element is a URI address where a second SpeechInfo object for the description element is acquired, and the second SpeechInfoURI element includes a third content-type attribute and a third content-enc attribute, wherein the third content-type is a content-type of the third SpeechInfo object referenced by the second SpeechInfoURI element and the third content-enc is a content encoding of the third SpeechInfo object referenced by the second SpeechInfoURI element, and wherein the second SpeechInfo element is embedded speech information object for the description element, and the second SpeechInfo element includes a fourth content-type attribute and a fourth content-enc attribute, wherein the fourth content-type is a content-type of a fourth SpeechInfo object and the fourth content-enc is a content encoding of the fourth SpeechInfo object, and the decoder is configured to decode the service guide.

Advantageous Effects of Invention

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 5 illustrates elements and attributes for speech/phonetic information.

FIG. 5A illustrates elements and attributes for speech/phonetic information.

FIG. 9 illustrates elements and attributes for speech/phonetic information.

FIG. 9A illustrates elements and attributes for speech/phonetic information.

DESCRIPTION OF EMBODIMENTS

Figure 1:
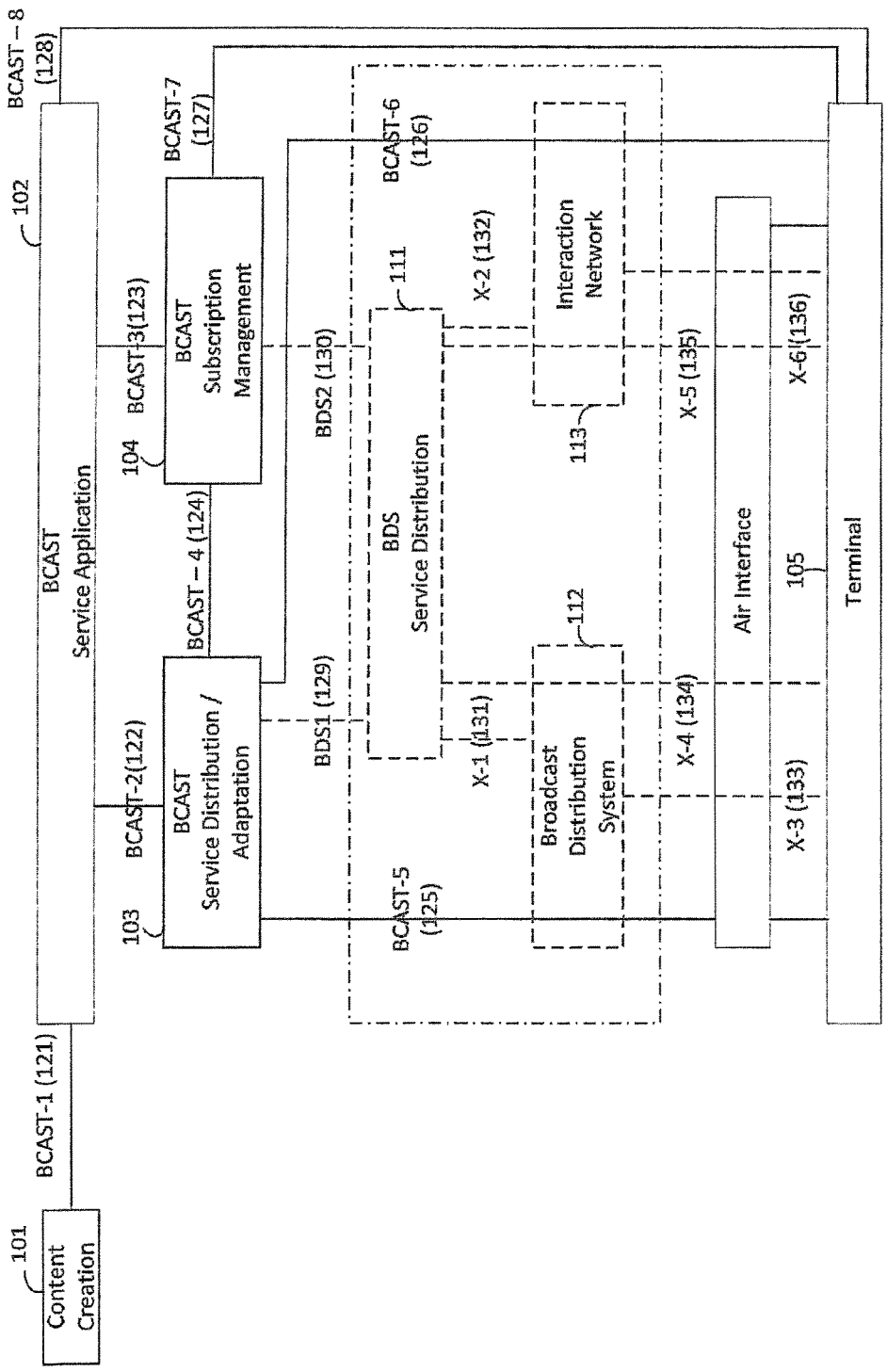
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) BCAST may include an application layer and a transport layer. The logical architecture of the BCAST system may include a Content Creation (CC) 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired.

In general, the Content Creation (CC) 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file/streaming delivery, service gathering, service protection, service guide creation/delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content/service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some embodiments, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and all data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and all data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Figure 2:
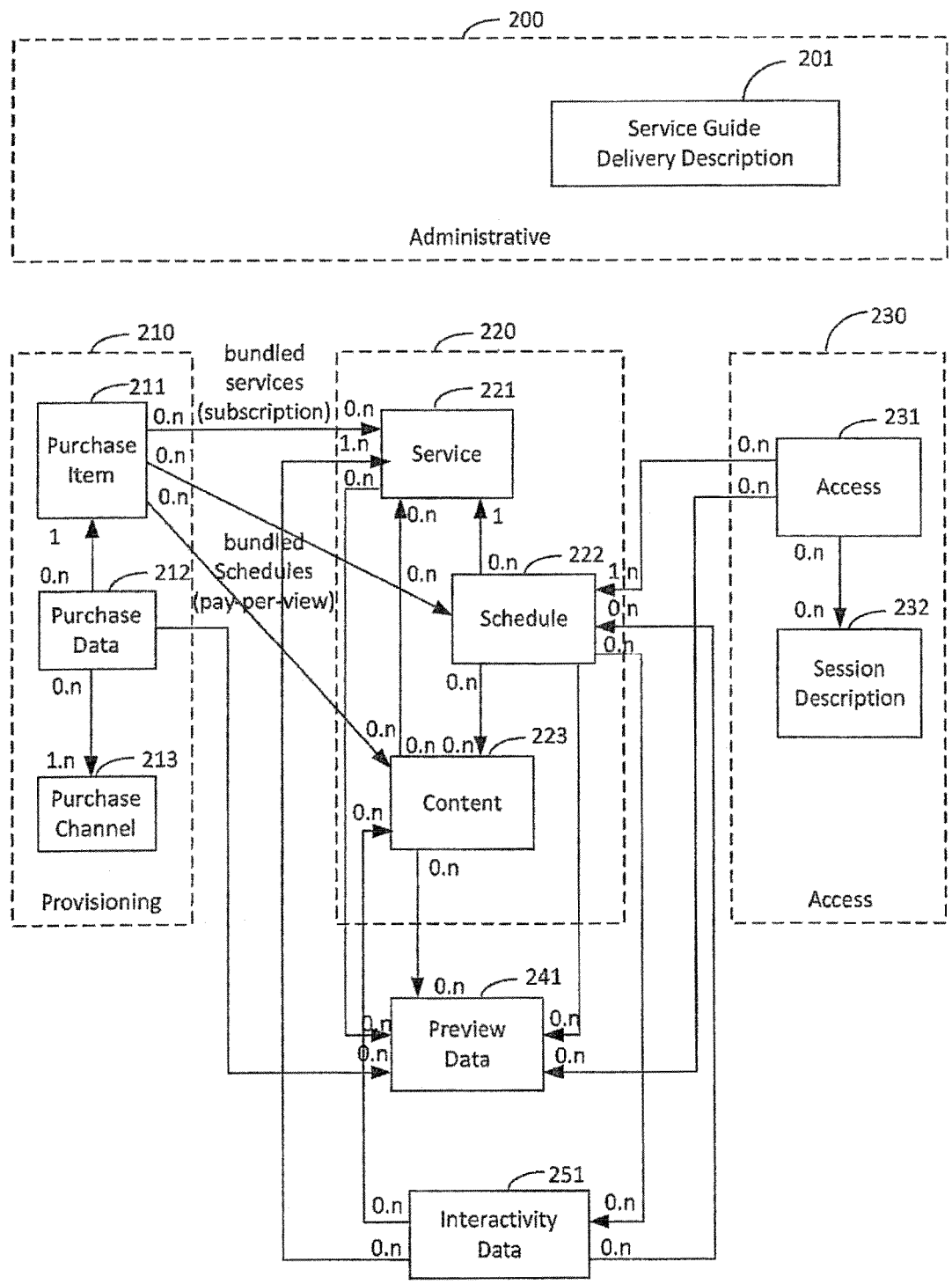
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired.

Figure 2A:
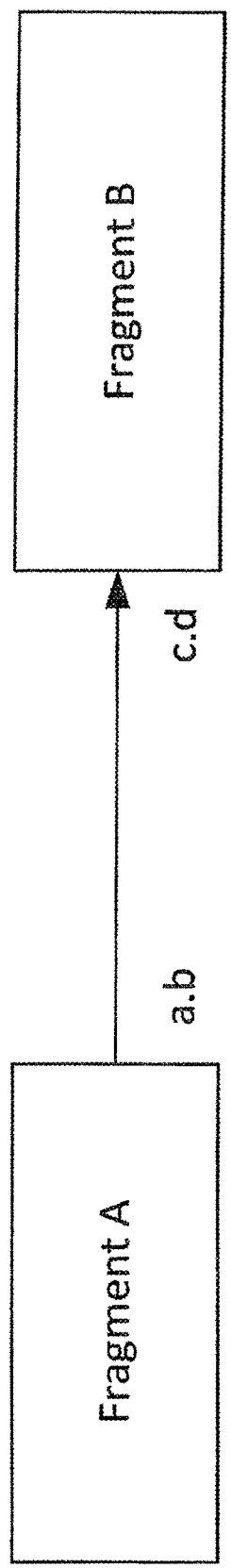
FIG. 2A is a diagram showing cardinalities and reference direction between service guide fragments.

FIG. 2A is a diagram showing cardinalities and reference direction between service guide fragments. The meaning of the cardinalities shown in the FIG. 2 is the following: One instantiation of Fragment A as in FIG. 2A references c to d instantiations of Fragment B. If c=d, d is omitted. Thus, if c>0 and Fragment A exists, at least c instantiation of Fragment B must also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2, in general, the service guide may include an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) block 201. The Provision Group 210 may include a Purchase Item block 211, a Purchase Data block 212, and a Purchase Channel block 213. The Core Group 220 may include a Service block 221, a Schedule block 222, and a Content block 223. The Access Group 230 may include an Access block 231 and a Session Description block 232.

The service guide may further include Preview Data 241 and Interactivity Data 251 in addition to the four information groups 200, 210, 220, and 230.

The aforementioned components may be referred to as basic units or fragments constituting aspects of the service guide, for purposes of identification.

The SGDD fragment 201 may provide information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD may also provide the information on the entry points for receiving the grouping information and notification messages.

The Service fragment 221, which is an upper aggregate of the content included in the broadcast service, may include information on service content, genre, service location, etc. In general, the 'Service' fragment describes at an aggregate level the content items which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments. Together with the associated fragments the terminal may determine the details associated with the service at any point of time. These details may be summarized into a user-friendly display, for example, of what, how and when the associated content may be consumed and at what cost.

The Access fragment 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service. The 'Access' fragment provides Session Description parameters either in the form of inline text, or through a pointer in the form of a URI to a separate Session Description. Session Description information may be delivered over either the broadcast channel or the interaction channel.

The Session Description fragment 232 may be included in the Access fragment 231, and may provide location information in a Uniform Resource Identifier (URI) form so that the terminal may detect information on the Session Description fragment 232. The Session Description fragment 232 may provide address information, codec information, etc., about multimedia content existing in the session. As such, the 'SessionDescription' is a Service Guide fragment which provides the session information for access to a service or content item. Further, the Session Description may provide auxiliary description information, used for associated delivery procedures. The Session Description information is provided using either syntax of SDP in text format, or through a 3GPP MBMS User Service Bundle Description [3GPP TS 26.346] (USBD). Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used both for Service Guide delivery itself as well as for the content sessions.

The Purchase Item fragment 211 may provide a bundle of service, content, time, etc., to help the user subscribe to or purchase the Purchase Item fragment 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data fragment 212 may include detailed purchase and subscription information, such as price information and promotion information, for the service or content bundle. The Purchase Channel fragment 213 may provide access information for subscription or purchase. As such, the main function of the 'PurchaseData' fragment is to express all the available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data fragment 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data fragment 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'InteractivityData' fragment points to one or many 'InteractivityMedia' documents that include xhtml files, static images, email template, SMS template, MMS template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityDat' a fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. his/her mobile operator) to which all purchase requests should be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, re-organized, and otherwise modified, or constrained as desired.

Figures 3, 4:
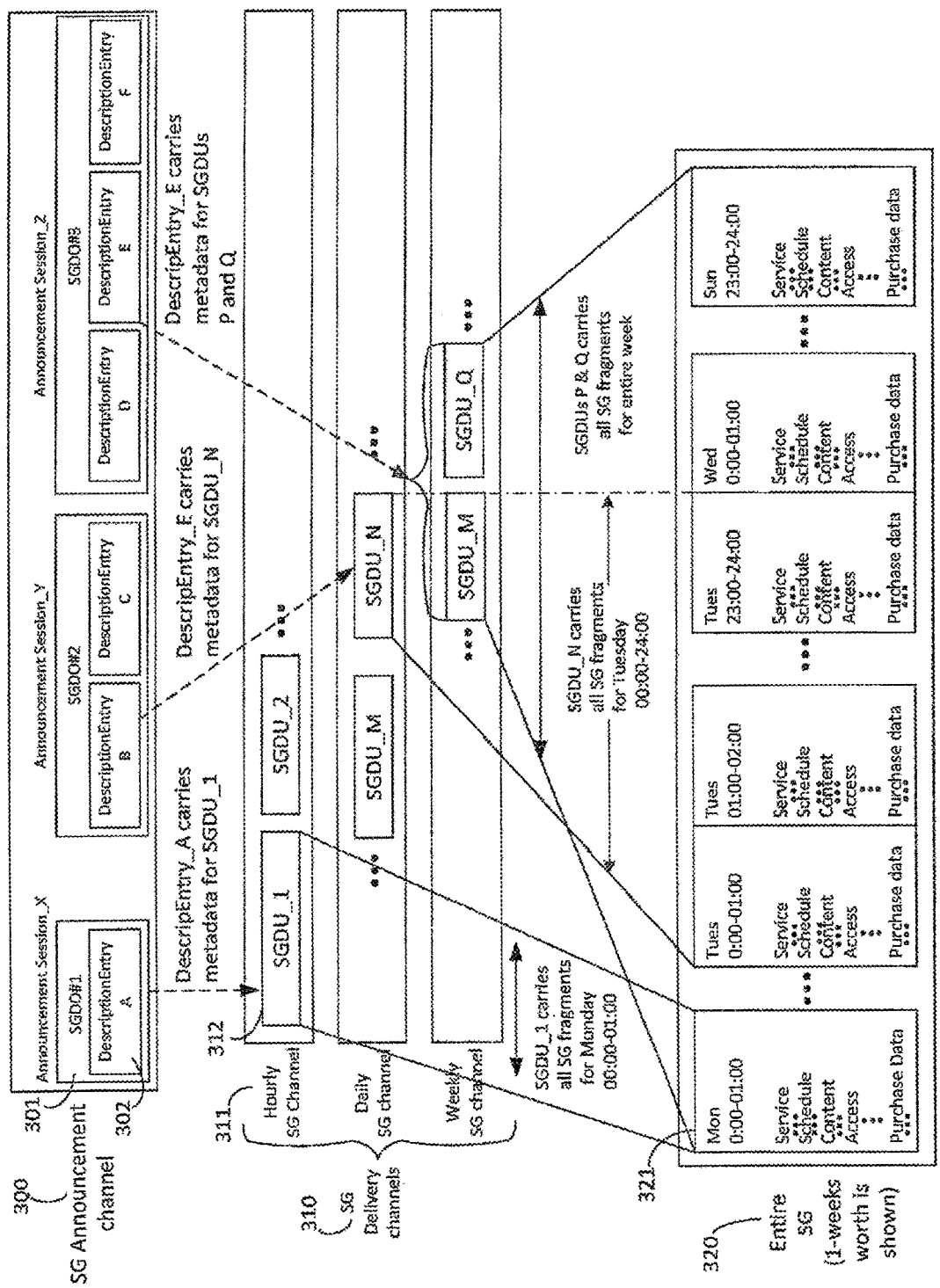
FIG. 3 is a block diagram illustrating a principle of the conventional service guide delivery method.
FIG. 4 illustrates description scheme.

Referring to FIG. 3, an exemplary block diagram illustrates aspects of a service guide delivery technique. The Service Guide Deliver Descriptor fragment 201 may include the session information, grouping information, and notification message access information related to all fragments containing service information. When the mobile broadcast service-enabled terminal 105 turns on or begins to receive the service guide, it may access a Service Guide Announcement Channel (SG Announcement Channel) 300.

The SG Announcement Channel 300 may include at least one of SGDD 200 (e.g., SGDD #1, . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the Service Guide Delivery Descriptor fragment 201 may be reflected in any suitable format, such as for example, a table format and/or in an eXtensible Markup Language (XML) schema.

The actual data is preferably provided in XML format according to the SGDD fragment 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present all of the SGDUs 312 to the user according to the corresponding group information.

Once the transport information is acquired, the terminal 105 may access all of the Delivery Channels acquired from a DescriptorEntry 302 in an SGDD 301 on an SG Delivery Channel 310 to receive the actual SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive all the SGDUs existing on the corresponding channels. Once the entire SGDU is completely received on the SG Delivery Channels 310, the terminal 105 checks all the fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission/reception systems may be described using terms of entities defined in the 3GPP standards and OMA BCAST standards (e.g., a scheme). However, the service guide/reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, . . . , E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's sub-element, E[n]=sub-element of element[n−1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a TV channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that situation, for the following elements: 'ParentalRating', 'TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use all declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile; and (7) Genre.

The "Name" element may refer to Name of the Service, possibly in multiple languages. The language may be expressed using built-in XML attribute 'xml:lang'.

The "Description" element may be in multiple languages and may be expressed using built-in XML attribute 'xml:lang'.

The "AudioLanguage" element may declare for the end users that this service is available with an audio track corresponding to the language represented by the value of this element. The textual value of this element can be made available for the end users in different languages. In such a case the language used to represent the value of this element may be signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes 'languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specify the parental rating system in use, in which context the value of the 'ParentalRating' element is semantically defined. This allows terminals to identify the rating system in use in a non-ambiguous manner and act appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national/local rules & regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support 'TargetUserProfile' element. The use of 'TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [MIGFG]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main", "second", and "other".

The "href" attribute may signal the controlled vocabulary used in the 'Genre' element.

After reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information defined within the programming guide to appropriately render the information in a manner suitable for the viewer. In particular, the traditional NTSC television stations typically have numbers such as, 2, 4, 6, 8, 12, and 49. For digital services, program and system information protocol includes a virtual channel table that, for terrestrial broadcasting defines each digital television service with a two-part number consisting of a major channel followed by a minor channel. The major channel number is usually the same as the NTSC channel for the station, and the minor channels have numbers depending on how many digital television services are present in the digital television multiples, typically starting at 1. For example, the analog television channel 9, WUSA-TV in Washington, D.C., may identify its two over-the-air digital services as follows: channel 9-1 WUSA-DT and channel 9-2 9-Radar. This notation for television channels is readily understandable by a viewer, and the programming guide elements may include this capability as an extension to the programming guide so that the information may be computationally efficiently processed by the receiving device and rendered to the viewer.

For many systems, it is desirable to include the capability to effectively provide blind or visually impaired persons the ability to more readily access video programming for a wide variety of video devices. For example, in a video programming guide it is desirable to permit the channel information, program information, menus, and other navigational and content related information to be read out (e.g., audio output) to the visually impaired person since they may have difficulty viewing the content or otherwise are unable to view the content because of blindness.

Existing video programming guides were developed in a manner to most effectively present the information contained therein for visual inspection (e.g., not for those who are blind or visually impaired). As a result, simply including a text-to-speech conversion tends to result in a generally inferior experience for the blind or visually impaired. For example, if the text of the programming guide includes "C C C" it may be read out as "C" "C" "C", but in many cases it would be preferable to read this out as "Triple C" for a more natural presentation. Similarly the pronunciation of foreign language text when using text-to-speech coversion may not be accurate. As an example the text "Les Miserables" would likely not be pronounced correctly with a traditional text-to-speech conversion. In this manner, it is desirable to include suitable information within the environment of the video programming guide that enables the device to select a more appropriate manner of providing the content contained therein to the blind and/or visually impaired. In other cases, especially with proper names and foreign words (e.g., words not geographically local to the design of the device, such as a device developed for the United States market pronouncing words written in French) manner in which the words are spoken may be difficult, at best, to understand. While such functionality may be included within the device to facilitate such limitations, the implementation of such functionality should be undertaken in a manner that does not introduce additional limitations or ambiguities. These functions may be implemented in any suitable environment, such as the environment illustrated in the enclosed figures.

Thus instead of only using text-to-speech coversion, information regarding pronunciation of words or sentences included in the service guide can be signalled within the service guide. This results in making the service guide information accessible. For example, reading out the service guide content names/descriptions using the signalled pronunciation information may be helpful for a visually impaired user. The information regarding pronunciation of words or sentences may be referred to as speech/phonetic information. The words "speech information", "phonetic information" and "speech/phonetic information" are used interchangeably.

In general, the speech/phonetic information may be signalled by including a reference in the service guide with the reference pointing to the speech/phonetic information (e.g. a URL/URI pointing to speech data) or by directly embedding the speech/phonetic information data in the service guide.

In one embodiment, the speech information may be signaled inside one or more fragments of OMA BCAST service guide. In particular, it may be signaled inside 'Content' fragment and/or 'Service' fragment and/or 'PreviewData' fragment and/or 'Purchase Item' fragment and/or 'Purchase Data' fragment and/or 'Purchase Channel' fragment.

In one embodiment, the speech information may be signaled using elements, sub-elements, and/or attributes as shown in FIG. 5.

In another embodiment the speech information could be signaled using elements, sub-elements and attributes as shown in FIG. 5A. In FIG. 5A the speech information related elements, sub-elements and attributes are signaled inside the "Name" and "Description" elements of the "Service" fragment and "Content" fragment of OMA BCAST service guide. Thus the "Name" and "Description" elements are parents of these new elements.

In another embodiment, a CDATA (character data) restriction may be used for the embedded speech data (SpeechInfo element). This may be done for example using a syntax where the embedded speech data is included inside <![CDATA[ ... ]]> section. Since the embedded speech data may be a markup data itself (e.g. SSML data) this allows including markup tags inside this element without the XML parser parsing and interpreting those as markup.

A constraint may be defined such that only one of speech information URL (e.g. SpeechInfoURI element) which points to externally specified speech information or embedded speech information data (e.g. SpeechInfo element) may be specified when the speech object is of the same type.

This limitation may be included because if it is allowed to include both the embedded speech information data (e.g. SpeechInfo element) and the speech information URL (e.g. SpeechInfoURI element) which points to externally specified speech information and if the type (e.g. content-type/mime-type) of both these elements is the same then the receiving entity will not know which of the two to use for reading out the pronunciation. To avoid this ambiguity, in this case, only one of the two elements is preferably allowed in the service guide data.

Figure 6:
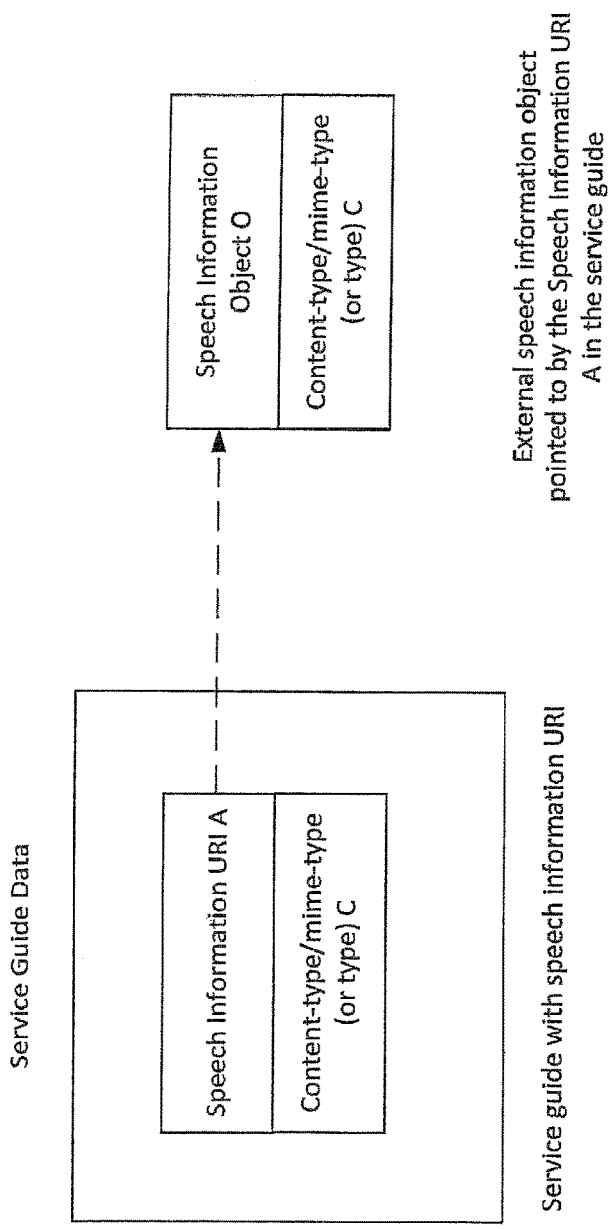
FIG. 6 illustrates speech information URI element in service guide.
Figure 7:
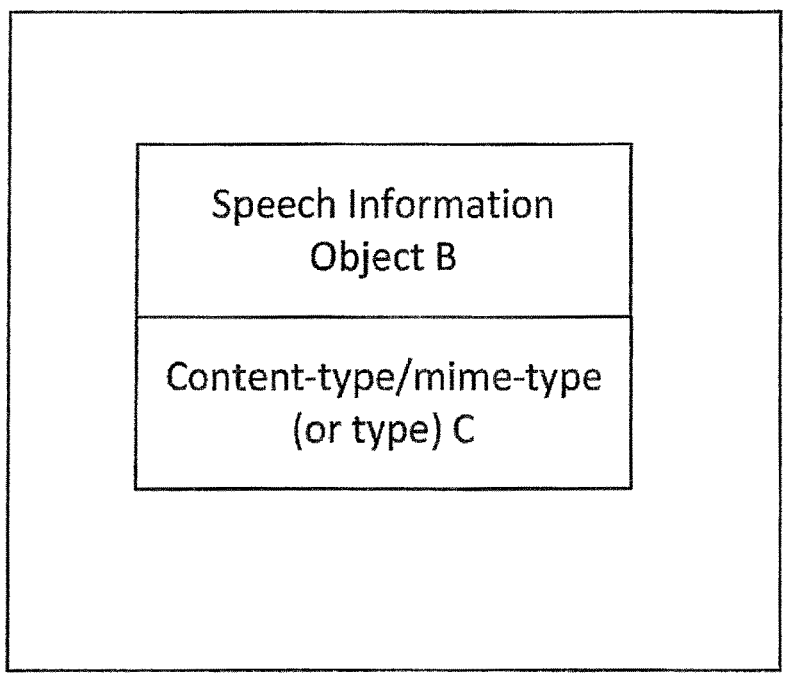
FIG. 7 illustrates speech information object element in service guide.

An exemplary example of this constraint is illustrated in FIG. 6 and FIG. 7.

Referring to FIG. 6, the service guide data includes a speech information URI A (e.g. SpeechInfoURI element) which has type (e.g. content-type/mime-type) equal to C. This URI A points to an external speech information object O which may for example reside on an external server. In this case, the type (e.g. content-type/mime-type) of the speech information object O is equal to C (same as indicated in the type attribute for Speech information URI element A).

Referring to FIG. 7, the service guide data includes an embedded speech information object B (e.g. SpeechInfo element) which has type (e.g. content-type/mime-type) equal to C. In this case, the type (e.g. content-type/mime-type) of the speech information object B is equal to C, same as indicated in the type attribute for Speech information URI element in FIG. 6.

As a result with the constraint specified in this manner, the service guide can not include both the embedded speech information data (e.g. SpeechInfo element) and speech information URL (e.g. SpeechInfoURI element) which points to externally specified speech information elements.

Figure 8:
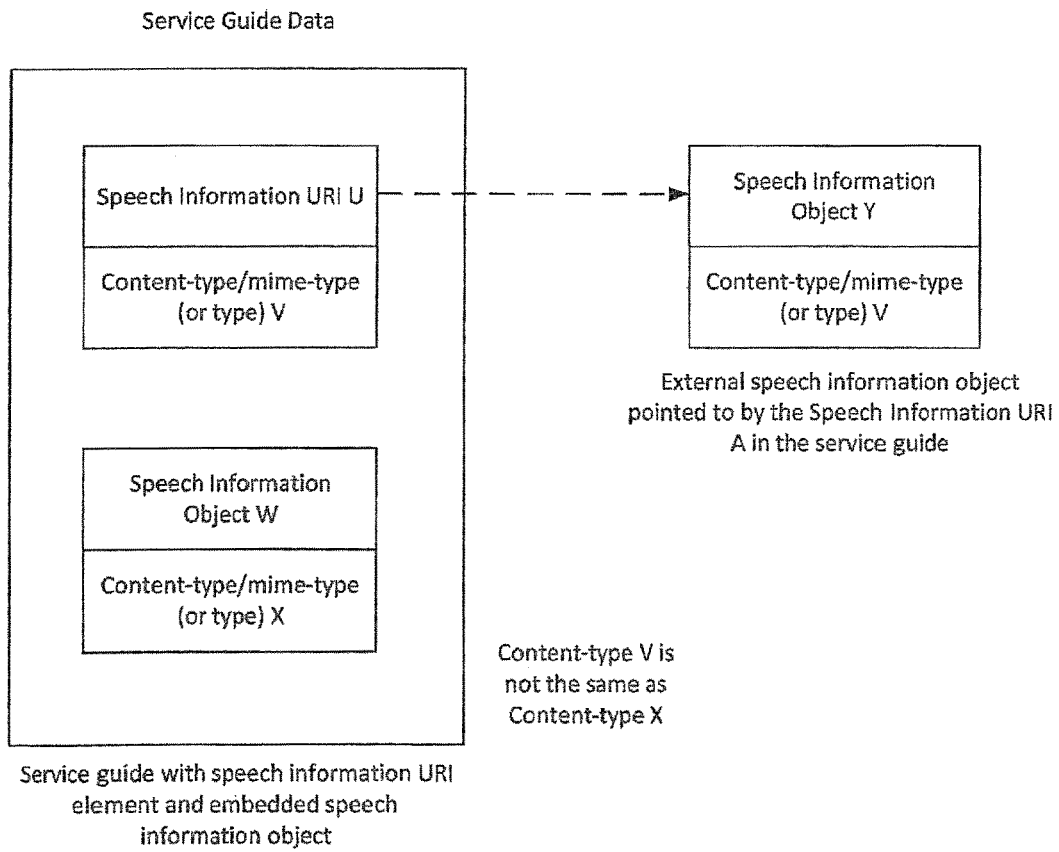
FIG. 8 illustrates speech information URI element and speech information object in service guide.

In some embodiments, when the type (e.g. content-type/mime-type) of the embedded speech information data (e.g. SpeechInfo element) and speech information URL (e.g. SpeechInfoURI element) which points to externally specified speech information is different then both of these elements may be allowed to be present in the service guide. In this case the receiving entity can make a decision regarding which one of the two objects to use based on its ability to handle particular type (e.g. content-type/mime-type) of data. This is illustrated in FIG. 8. In FIG. 8 the service guide data includes a speech information URI U (e.g. SpeechInfoURI element) which has type (e.g. content-type/mime-type) equal to V. It also includes an embedded speech information object W (e.g. SpeechInfo element) which has type (e.g. content-type/mime-type) equal to X. In this case the type (e.g. content-type/mime-type) of the speech information URI element (V) is not the same as (e.g. content-type/mime-type) the type of the embedded speech information element (X). It is also noted that the speech information URI A points to an external speech information object Y which may for example reside on an external server. In this case the type (e.g. content-type/mime-type) of the speech information object Y is equal to V (same as indicated in the type attribute for Speech information URI element U).

A content-type attribute may be signaled for speech information URL and for embedded speech information data elements.

The content-type attribute for speech information URL element may be optional.

The content-type attribute for embedded speech information element may be mandatory.

Instead of "type" attribute of anyURI type, the content-type attribute of string type may be signaled for speech information URL element and for embedded speech information element.

One of the purposes of the content-type attribute field may be to describe the data type of the speech object referred by the URL and/or by the embedded. This knowledge may allow the receiving entity to select an appropriate agent or mechanism to present the data to the user. In general, the data type of the speech object referred by the URL may be obtained by sending a request to that object. For example a HTTP GET or HTTP HEAD request may be sent. However sending such a request and getting a response may add the latency. Thus including the content-type of the speech object referred by the URL in the service guide may quickly allow the receiving entity to know the type of data being referred. For example, if the receiving entity does not understand how to render data of a particular content-type as signaled by the content-type attribute value then it will not need to refer/send a request to the external object. In one embodiment the semantics of the Content-Type header from RFC 2616 (HTTP) may be used as the semantic for the attribute "content-type".

In one embodiment: The semantics of content-type shall obey the semantics of Content-Type header of HTTP/1.1 protocol RFC 2616.

In an alternative embodiment, an attribute "content-enc" may be optionally signaled for embedded speech information data elements. This allows describing additional encoding applied to the embedded speech information object such as applying compression (e.g. gzip). Since the size of embedded speech information data in ESG may be large so compressing it may be beneficial in reducing the size.

In one embodiment, the semantics of the Content-Encoding header from RFC 2616 (HTTP) could be used as the semantic for the attribute "content-enc".

In one embodiment: The semantics of content-enc shall obey the semantics of Content-Encoding header of HTTP/1.1 protocol RFC 2616.

FIG. 9 illustrates the inclusion of content encoding related attribute in addition to other speech information related elements and attributes.

In another embodiment the speech information could be signaled using elements, sub-elements and attributes as shown in FIG. 9A. In FIG. 9A the speech information related elements, sub-elements and attributes are signaled inside the "Name" and "Description" elements of the "Service" fragment and "Content" fragment of OMA BCAST service guide. Thus the "Name" and "Description" elements are parents of these new elements.

In yet another embodiment, a single attribute content-type-enc may be signaled for speech information URL and for embedded speech information data elements as a whitespace separated concatenated string of 'content-type' and 'content-enc' attributes with semantics and details, as described above. The content-type-enc attribute may be mandatory for speech information URL element and may be mandatory for the embedded speech information element.

Also in this case the content-enc part of the string may be optional.

e.g. using ABNF notation: content-type-enc=content-type WSP (content-enc). Where WSP is white space and Augmented Backus-Naur Form (ABNF) is described in RFC 5234 (http://www.ietf.org/rfc/rfc5234.txt).

The cardinality of speech information URL (e.g. SpeechInfoURI element) which points to externally specified speech information may be equal to 0 . . . 1, which means that zero or one such element may be present in the service guide.

The cardinality of embedded speech information data (e.g. SpeechInfo element) may be equal to 0 . . . 1, which means that zero or one such element may be present in the service guide.

This is because one speech information URI element and one embedded speech information element are sufficient to indicate the phonetic information as these elements can apply to the entire Name and Description elements. Also when using SSML the elements such as <phoneme> element can already occur multiple times inside the SSML.

In another embodiment, the cardinality of some of the elements may be changed from 0 . . . 1 to 0 . . . N only when the type (e.g. content-type/mime-type) of those elements are different. In this case one or more of the following constraints may be defined:

The cardinality of speech information URL element (e.g. SpeechInfoURI element) which points to externally specified speech information may be equal to 0 . . . N, which means that zero or more such elements may be present in the service guide if the 'content-type' of each of the speech information URL element (e.g. SpeechInfoURI element) is different.

In another embodiment, the constraint may be stated as:

When more than one speech information URL element (e.g. SpeechInfoURI element) is present in the service guide, the value of 'content-type' attribute of each of the speech information URL element (e.g. SpeechInfoURI element) may be different.

The cardinality of embedded speech information data element (e.g. SpeechInfo element) which points to externally specified speech information may be equal to 0 . . . N, which means that zero or more such elements may be present in the service guide if the 'content-type' of each of the embedded speech information data element (e.g. SpeechInfo element) is different.

In another embodiment, the constraint may be stated as:

When more than one embedded speech information data element (e.g. SpeechInfo element) is present in the service guide, the value of 'content-type' attribute of each of the embedded speech information data element (e.g. SpeechInfo element) may be different.

The XML schema may be defined to syntactically restrict the presence of only one of the two elements: speech information URL element and embedded speech information data element.

An example XML schema for this is shown below:

List 1

```
<?xml version="1.0" encoding="UTF-8"?>
<xs:schema xmlns:xs="http://www.w3.org/2001/XMLSchema">
    <xs:element name="SpeechInfoObject" type="SpeechInfoType"/>
    <xs:complexType name="SpeechInfoType">
        <xs:choice>
            <xs:element name="SpeechInfoURI" minOccurs="0"
            maxOccurs="1">
                <xs:complexType>
                    <xs:simpleContent>
                        <xs:extension base="xs:anyURI">
                            <xs:attribute name="Type"
                            type="xs:string" use="optional"/>
                        </xs:extension>
                    </xs:simpleContent>
                </xs:complexType>
            </xs:element>
            <xs:element name="SpeechInfo" minOccurs="0"
            maxOccurs="1">
                <xs:complexType>
                    <xs:simpleContent>
                        <xs:extension base="xs:string">
                            <xs:attribute name="Type"
                            type="xs:string" use="required"/>
                        </xs:extension>
                    </xs:simpleContent>
                </xs:complexType>
            </xs:element>
        </xs:choice>
    </xs:complexType>
</xs:schema>
```

Figure 10:
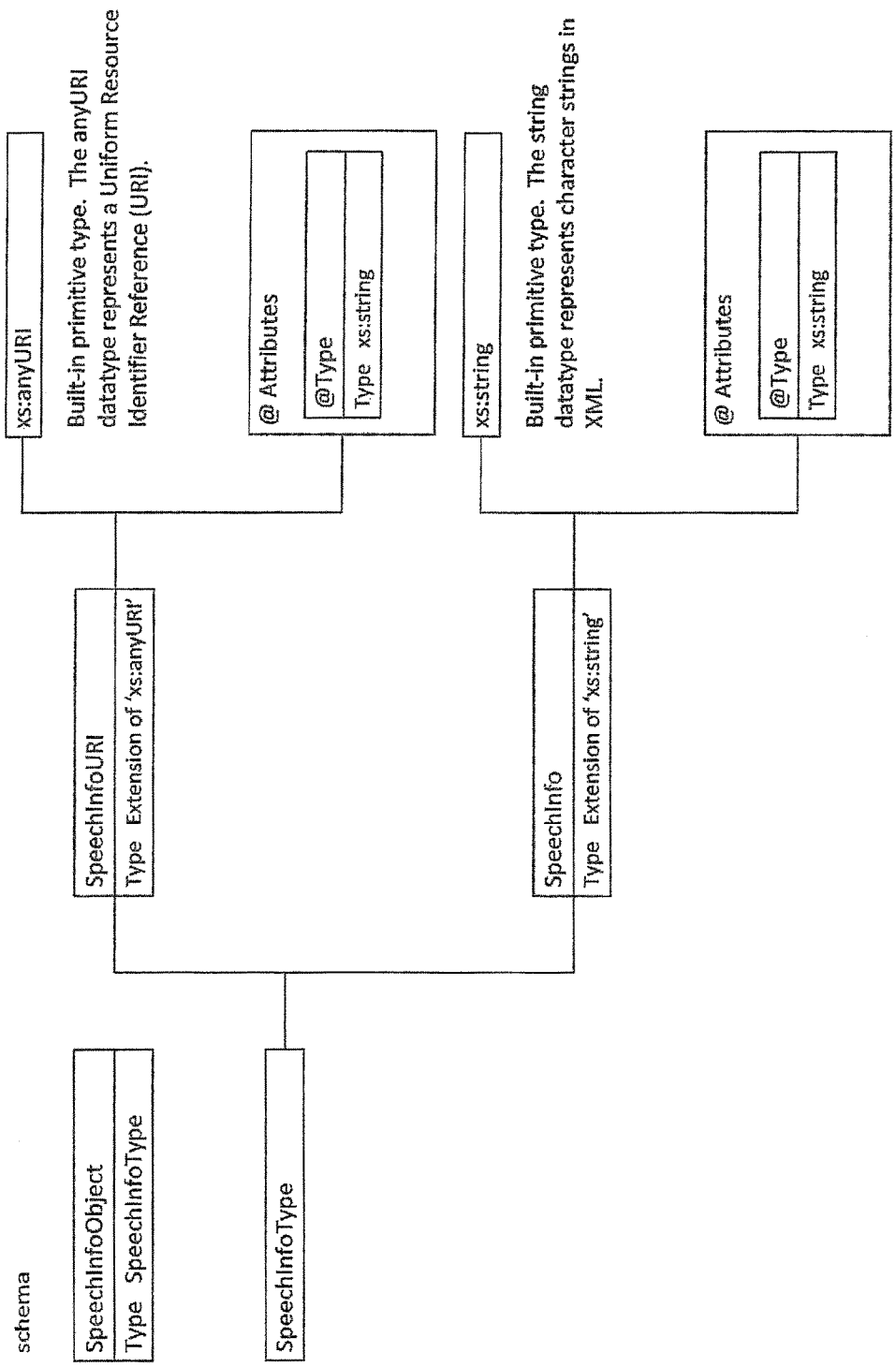
FIG. 10 illustrates structure of an exemplary XML schema.

Representation of such an XML schema to syntactically restrict the presence of only one of the two elements: speech information URL element and embedded speech information data element may be indicated as shown in FIG. 10.

In an alternative embodiment such a restriction may not be defined inside XML schema and the constraint may be simply imposed semantically. Thus either one of the following two constraints may be required:

Only one of the two elements: the speech information URL (e.g. SpeechInfoURI element) and embedded speech information data (e.g. SpeechInfo element) may be present.

In another embodiment this constraint may be stated as:

Only one of the two elements: the speech information URL (e.g. SpeechInfoURI element) and embedded speech information data (e.g. SpeechInfo element) shall be present inside a parent "Name" or "Description" element.

In another embodiment this constraint may be stated as:

Only one of the two elements: the SpeechInfoURI element and SpeechInfo element shall be present inside a parent Name or Description element.

When the type (e.g. content-type/mime-type) of the speech information URL (e.g. SpeechInfoURI element) and embedded speech information data (e.g. SpeechInfo element) is different (than each other) then both these elements may be present in the service guide.

In another embodiment this constraint may be stated as:

When more than one speech information URL element (e.g. SpeechInfoURI element) and embedded speech information data element (e.g. SpeechInfo element) are present in the service guide, the value of 'content-type' attribute of each of the speech information URL element (e.g. SpeechInfoURI element) and embedded speech information data element (e.g. SpeechInfo element) may be different.

In another embodiment this constraint may be stated as:

When more than one SpeechInfoURI element and SpeechInfo element are present inside a parent Name or Description element in the service guide, the value of Type/content-type attribute of each of the SpeechInfoURI element and SpeechInfo element shall be different.

In this case an example XML schema may be as shown below:

List 2

```
<?xml version="1.0" encoding="UTF-8"?>
<xs:schema xmlns:xs="http://www.w3.org/2001/XMLSchema">
    <xs:element name="SpeechInfoObject" type="SpeechInfoType"/>
    <xs:complexType name="SpeechInfoType">
        <xs:all>
            <xs:element name="SpeechInfoURI" minOccurs="0"
            maxOccurs="1">
                <xs:complexType>
                    <xs:simpleContent>
                        <xs:extension base="xs:anyURI">
                            <xs:attribute name="Type"
                            type="xs:string" use="optional"/>
                        </xs:extension>
                    </xs:simpleContent>
                </xs:complexType>
            </xs:element>
            <xs:element name="SpeechInfo" minOccurs="0"
            maxOccurs="1">
                <xs:complexType>
                    <xs:simpleContent>
                        <xs:extension base="xs:string">
                            <xs:attribute name="Type"
                            type="xs:string" use="required"/>
                        </xs:extension>
                    </xs:simpleContent>
                </xs:complexType>
            </xs:element>
        </xs:all>
    </xs:complexType>
</xs:schema>
```

In yet another embodiment the cardinality of elements may be relaxed further.

In this case an example XML schema may be as shown below:

List 3

```
<?xml version="1.0" encoding="UTF-8"?>
<xs:schema xmlns:xs="http://www.w3.org/2001/XMLSchema">
    <xs:element name="SpeechInfoObject" type="SpeechInfoType"/>
    <xs:complexType name="SpeechInfoType">
        <xs:sequence>
            <xs:element name="SpeechInfoURI" minOccurs="0" maxOccurs="unbounded">
                <xs:complexType>
                    <xs:simpleContent>
                        <xs:extension base="xs:anyURI">
                            <xs:attribute name="Type"
                                type="xs:string" use="optional"/>
                        </xs:extension>
                    </xs:simpleContent>
                </xs:complexType>
            </xs:element>
            <xs:element name="SpeechInfo" minOccurs="0" maxOccurs="unbounded">
                <xs:complexType>
                    <xs:simpleContent>
                        <xs:extension base="xs:string">
                            <xs:attribute name="Type"
                                type="xs:string" use="required"/>
                        </xs:extension>
                    </xs:simpleContent>
                </xs:complexType>
            </xs:element>
        </xs:sequence>
    </xs:complexType>
</xs:schema>
```

Additional embodiments for signaling the speech/phonetic information using elements, sub-elements, and/or attributes may be included.

Information regarding pronunciation of words or sentences included in the service guide can be signalled within service guide. This can be helpful in making the service guide information accessible. For example reading out the service guide content names/descriptions using the signalled pronunciation information may be helpful for visually impaired user. The information regarding pronunciation of words or sentences will be referred to as speech/phonetic information.

In general it is useful to include the speech/phonetic information by including a reference in service guide with the reference pointing to the speech/phonetic information (e.g. a URL/URI pointing to speech data) or by directly embedding the speech/phonetic information data in the service guide.

In one embodiment the speech information could be signaled inside one or more fragments of OMA BCAST service guide. In particular it may be signaled inside 'Content' fragment and/or 'Service' fragment and/or 'PreviewData' fragment and/or 'Purchase Item' fragment and/or 'Purchase Data' fragment and/or 'Purchase Channel' fragment.

In one embodiment the speech information could be signaled using elements, sub-elements and attributes as shown in table 1 (Speech Phonetic Information Extensions) below.

Elements Name and Description elements from OMA BCAST service fragment are extended with addition of sub-elements and attributes related to speech phonetic information, as listed in Table 1: Speech Phonetic Information Extensions.

TABLE 1

Speech Phonetic Information Extensions

| Name | Type | Category | Cardinality | Description | Data Type |
|---|---|---|---|---|---|
| Name | E1 | NM/TM | 0 . . . N | Name of the Service, possibly in multiple languages. The language is expressed using built-in XML attribute 'xml:lang' with this element. Contains the following elements: SpeechInfoURI SpeechInfo | String |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |
| Description | E1 | NM/TM | 0 . . . N | Description, possibly in multiple languages. The language is expressed using built-in XML attribute 'xml:lang' with this element. | String |

TABLE 1-continued

Speech Phonetic Information Extensions

| Name | Type | Category | Cardinality | Description | Data Type |
|---|---|---|---|---|---|
| SpeechInfoURI | E2 | NM/TM | 0 . . . N | Contains the following elements: SpeechInfoURI SpeechInfo The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |

Additionally one or more of the following constraints apply.

When more than one SpeechInfoURI element and SpeechInfo element are present inside a parent Name or Description element in the service guide, the value of content-type attribute of each of the SpeechInfoURI element and SpeechInfo element shall be different.

The semantics of content-type attribute for SpeechInfoURI element and SpeechInfo element shall obey the semantics of Content-Type header of HTTP/1.1 protocol RFC 2616.

When the content-type attribute is not present for SpeechInfoURI element or SpeechInfo element it is inferred to have a value of "application/ssml+xml" for that element.

The semantics of content-enc attribute for SpeechInfoURI element and SpeechInfo element shall obey the semantics of Content-Encoding header of HTTP/1.1 protocol RFC 2616.

When the content-enc attribute is not present for SpeechInfoURI element or SpeechInfo element the associated speech information object for the corresponding SpeechInfoURI element or SpeechInfo is assumed to have no additional content encoding applied.

In another embodiment when the content-enc attribute is not present for SpeechInfoURI element or SpeechInfo element it is inferred to have a value of "identity" for that element.

In another embodiment one or more of the following may apply.

When the content-type attribute is not present for SpeechInfoURI element it is inferred to have a value of "application/ssml+xml" for that element.

When the content-type attribute is not present for SpeechInfo element it is inferred to have a value of "application/ssml+xml" for that element.

In other embodiments instead of "application/ssml+xml" the default value for the content-type attribute when not present may be inferred to be some other value such as either "application/voicexml+xml", or "application/srgs", "application/srgs+xml", "application/ccxml+xml", and "application/pls+xml", or "text/ssml+xml", or some other media type value defined in http://www.iana.org/assignments/media-types/media-types.xhtml or some other value.

When the content-enc attribute is not present for SpeechInfoURI element the associated speech information object is assumed to have no additional content encoding applied.

When the content-enc attribute is not present for SpeechInfo element the associated speech information object is assumed to have no additional content encoding applied. When the content-enc attribute is not present for SpeechInfoURI element it is inferred to have a value of "identity" for that element.

When the content-enc attribute is not present for SpeechInfo element it is inferred to have a value of "identity" for that element.

In one embodiment the speech information could be additionally signaled using elements, sub-elements and attributes as shown in table 2 below.

Elements Name and Description elements from service fragment are extended with addition of sub-elements and attributes related to speech phonetic information, as listed in, as listed in Table 2 Speech Phonetic Information Extensions.

TABLE 2

Speech Phonetic Information Extensions

| Name | Type | Category | Cardinality | Description | Data Type |
|---|---|---|---|---|---|
| Name | E1 | NM/TM | 0 . . . N | Name of the 'Content' fragment, possibly in multiple languages. The language is expressed using built-in | String |

TABLE 2-continued

Speech Phonetic Information Extensions

| Name | Type | Category | Cardinality | Description | Data Type |
|---|---|---|---|---|---|
| | | | | XML attribute 'xml:lang' with this element.<br>Contains the following elements:<br>SpeechInfoURI<br>SpeechInfo | |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages.<br>Contains following attribute:<br>content-type<br>content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element.<br>Contains following attribute:<br>content-type<br>content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |
| Description | E1 | NM/TM | 0 . . . N | Description, possibly in multiple languages. The language is expressed using built-in XML attribute 'xml:lang' with this element.<br>Contains the following elements:<br>SpeechInfoURI<br>SpeechInfo | String |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages.<br>Contains following attribute:<br>content-type<br>content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element.<br>Contains following attribute:<br>content-type<br>content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |

Additionally one or more of the following constraints may apply.

When more than one SpeechInfoURI element and SpeechInfo element are present inside a parent Name or Description element in the service guide, the value of content-type attribute of each of the SpeechInfoURI element and SpeechInfo element shall be different.

The semantics of content-type attribute for SpeechInfoURI element and SpeechInfo element shall obey the semantics of Content-Type header of HTTP/1.1 protocol RFC 2616.

When the content-type attribute is not present for SpeechInfoURI element or SpeechInfo element it is inferred to have a value of "application/ssml+xml" for that element.

The semantics of content-enc attribute for SpeechInfoURI element and SpeechInfo element shall obey the semantics of Content-Encoding header of HTTP/1.1 protocol RFC 2616.

When the content-enc attribute is not present for SpeechInfoURI element or SpeechInfo element the associated speech information object for the corresponding SpeechInfoURI element or SpeechInfo is assumed to have no additional content encoding applied.

In another embodiment when the content-enc attribute is not present for SpeechInfoURI element or SpeechInfo element it is inferred to have a value of "identity" for that element.

In another embodiment one or more of the following may apply.

When the content-type attribute is not present for SpeechInfoURI element it is inferred to have a value of "application/ssml+xml" for that element.

When the content-type attribute is not present for SpeechInfo element it is inferred to have a value of "application/ssml+xml" for that element.

In other embodiments instead of "application/ssml+xml" the default value for the content-type attribute when not present may be inferred to be some other value such as either "application/voicexml+xml", or "application/srgs", "application/srgs+xml", "application/ccxml+xml", and "application/pls+xml", or "text/ssml+xml", or some other media type value defined in http://www.iana.org/assignments/media-types/media-types.xhtml or some other value.

When the content-enc attribute is not present for SpeechInfoURI element the associated speech information object is assumed to have no additional content encoding applied. When the content-enc attribute is not present for SpeechInfo element the associated speech information object is assumed to have no additional content encoding applied.

When the content-enc attribute is not present for SpeechInfoURI element it is inferred to have a value of "identity" for that element.

When the content-enc attribute is not present for SpeechInfo element it is inferred to have a value of "identity" for that element.

In another embodiment the following may apply. The speech information could be signaled using elements, sub-elements and attributes as shown in table 3 below. Elements Name and Description elements from OMA BCAST service fragment are extended with addition of sub-elements and attributes related to speech phonetic information, as listed in Table 1: Speech Phonetic Information Extensions. Each of the Name and Description elements include a text attribute which provides the name and description respectively. Language of the text attribute is expressed with XML attribute 'xml:lang'.

TABLE 3

Speech Phonetic Information Extensions

| Name | Type | Category | Cardinality | Description | Data Type |
|---|---|---|---|---|---|
| Name | E1 | NM/TM | 0 . . . N | Extended Name element which includes sub-elements to indicate name and phonetic information about name. Contains the following elements: SpeechInfoURI SpeechInfo Contains following attributes: text xml:lang | |
| text | A | NM/TM | 1 | Name of the Service. | string |
| xml:lang | A | NM/TM | 0 . . . 1 | The language of the text attribute expressed with XML attribute 'xml:lang' | string |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |
| Description | E1 | NM/TM | 0 . . . N | Extended Description element which includes sub-elements to indicate description and phonetic information about description. Contains the following elements: SpeechInfoURI SpeechInfo Contains following attributes: text xml:lang | |
| text | A | NM/TM | 1 | Description of the Service. | string |
| xml:lang | A | NM/TM | 0 . . . 1 | The language of the text attribute expressed with XML attribute 'xml:lang' | string |
| SpeechInfoURI | E2 | NM/TM | 0 . . . N | The URI address where SpeechInfo object for parent Name element is acquired. Speech file may be encoded in SSML format | anyURI |

TABLE 3-continued

Speech Phonetic Information Extensions

| Name | Type | Category | Cardinality | Description | Data Type |
|---|---|---|---|---|---|
| | | | | (http://www.w3.org/TR/speech-synthesis11/) or similar types of mark up languages. Contains following attribute: content-type content-enc | |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |

Additionally one or more of the following constraints may apply.

When more than one SpeechInfoURI element and SpeechInfo element are present inside a parent Name or Description element in the service guide, the value of content-type attribute of each of the SpeechInfoURI element and SpeechInfo element shall be different.

The semantics of content-type attribute for SpeechInfoURI element and SpeechInfo element shall obey the semantics of Content-Type header of HTTP/1.1 protocol RFC 2616.

When the content-type attribute is not present for SpeechInfoURI element or SpeechInfo element it is inferred to have a value of "application/ssml+xml" for that element.

The semantics of content-enc attribute for SpeechInfoURI element and SpeechInfo element shall obey the semantics of Content-Encoding header of HTTP/1.1 protocol RFC 2616.

When the content-enc attribute is not present for SpeechInfoURI element or SpeechInfo element the associated speech information object for the corresponding SpeechInfoURI element or SpeechInfo is assumed to have no additional content encoding applied.

In another embodiment when the content-enc attribute is not present for SpeechInfoURI element or SpeechInfo element it is inferred to have a value of "identity" for that element.

In another embodiment one or more of the following may apply:

When the content-type attribute is not present for SpeechInfoURI element it is inferred to have a value of "application/ssml+xml" for that element.

When the content-type attribute is not present for SpeechInfo element it is inferred to have a value of "application/ssml+xml" for that element.

In other embodiments instead of "application/ssml+xml" the default value for the content-type attribute when not present may be inferred to be some other value such as either "application/voicexml+xml", or "application/srgs", "application/srgs+xml", "application/ccxml+xml", and "application/pls+xml", or "text/ssml+xml", or some other media type value defined in http://www.iana.org/assignments/media-types/media-types.xhtml or some other value. When the content-enc attribute is not present for SpeechInfoURI element the associated speech information object is assumed to have no additional content encoding applied.

When the content-enc attribute is not present for SpeechInfo element the associated speech information object is assumed to have no additional content encoding applied. When the content-enc attribute is not present for SpeechInfoURI element it is inferred to have a value of "identity" for that element.

When the content-enc attribute is not present for SpeechInfo element it is inferred to have a value of "identity" for that element.

In one embodiment the speech information could be additionally signaled using elements, sub-elements and attributes as shown in table 4 below.

Elements Name and Description elements from service fragment are extended with addition of sub-elements and attributes related to speech phonetic information, as listed in, as listed in Table 2 Speech Phonetic Information Extensions.

TABLE 4

Speech Phonetic Information Extensions

| Name | Type | Category | Cardinality | Description | Data Type |
|---|---|---|---|---|---|
| Name | E1 | NM/TM | 0 . . . N | Extended Name element which includes sub-elements to indicate name and phonetic information about name. Contains the following elements: SpeechInfoURI SpeechInfo | |

TABLE 4-continued

Speech Phonetic Information Extensions

| Name | Type | Category | Cardinality | Description | Data Type |
|---|---|---|---|---|---|
| | | | | Contains following attributes:<br>text<br>xml:lang | |
| text | A | NM/TM | 1 | Name of the 'Content' fragment. | string |
| xml:lang | A | NM/TM | 0 . . . 1 | The language of the text attribute expressed with XML attribute 'xml:lang' | string |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages.<br>Contains following attribute:<br>content-type<br>content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element.<br>Contains following attribute:<br>content-type<br>content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |
| Description | E1 | NM/TM | 0 . . . N | Extended Description element which includes sub-elements to indicate description and phonetic information about description.<br>Contains the following elements:<br>SpeechInfoURI<br>SpeechInfo<br>Contains following attributes:<br>text<br>xml:lang | |
| text | A | NM/TM | 1 | Description of the Content. | string |
| xml:lang | A | NM/TM | 0 . . . 1 | The language of the text attribute expressed with XML attribute 'xml:lang' | string |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages.<br>Contains following attribute:<br>content-type<br>content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element.<br>Contains following attribute:<br>content-type<br>content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |

Additionally one or more of the following constraints apply.

When more than one SpeechInfoURI element and SpeechInfo element are present inside a parent Name or Description element in the service guide, the value of content-type attribute of each of the SpeechInfoURI element and SpeechInfo element shall be different.

The semantics of content-type attribute for SpeechInfoURI element and SpeechInfo element shall obey the semantics of Content-Type header of HTTP/1.1 protocol RFC 2616.

When the content-type attribute is not present for SpeechInfoURI element or SpeechInfo element it is inferred to have a value of "application/ssml+xml" for that element.

The semantics of content-enc attribute for SpeechInfoURI element and SpeechInfo element shall obey the semantics of Content-Encoding header of HTTP/1.1 protocol RFC 2616.

When the content-enc attribute is not present for SpeechInfoURI element or SpeechInfo element the associated speech information object for the corresponding SpeechInfoURI element or SpeechInfo is assumed to have no additional content encoding applied.

In another embodiment when the content-enc attribute is not present for SpeechInfoURI element or SpeechInfo element it is inferred to have a value of "identity" for that element.

In another embodiment one or more of the following may apply.

When the content-type attribute is not present for SpeechInfoURI element it is inferred to have a value of "application/ssml+xml" for that element.

When the content-type attribute is not present for SpeechInfo element it is inferred to have a value of "application/ssml+xml" for that element.

In other embodiments instead of "application/ssml+xml" the default value for the content-type attribute when not present may be inferred to be some other value such as either "application/voicexml+xml", or "application/srgs", "application/srgs+xml", "application/ccxml+xml", and "application/pls+xml", or "text/ssml+xml", or some other media type value defined in http://www.iana.org/assignments/media-types/media-types.xhtml or some other value.

When the content-enc attribute is not present for SpeechInfoURI element the associated speech information object is assumed to have no additional content encoding applied.

When the content-enc attribute is not present for SpeechInfo element the associated speech information object is assumed to have no additional content encoding applied. When the content-enc attribute is not present for SpeechInfoURI element it is inferred to have a value of "identity" for that element.

When the content-enc attribute is not present for SpeechInfo element it is inferred to have a value of "identity" for that element.

In an alternative embodiment the speech information could be signaled using elements, sub-elements and attributes as shown in table 5 below.

Elements Name and Description elements from OMA BCAST service fragment are extended with addition of sub-elements and attributes related to speech phonetic information as listed in Table 1: Speech Phonetic Information Extensions. Each of the Name and Description elements include a Text element which provides the name and description respectively.

TABLE 5

Speech Phonetic Information Extensions

| Name | Type | Category | Cardinality | Description | Data Type |
|---|---|---|---|---|---|
| Name | E1 | NM/TM | 0 ... N | Extended Container element which includes sub-elements to indicate name and phonetic information about name. Contains the following elements:<br>Text<br>SpeechInfoURI<br>SpeechInfo | |
| Text | E2 | NM/TM | 1 | Name of the Service, possibly in multiple languages. The language is expressed using built-in XML attribute 'xml:lang' with this element. | string |
| SpeechInfoURI | E2 | NM/TM | 0 ... N | The URI address where SpeechInfo object for parent Name element is acquired. Speech file may be encoded in SSML format (http://www.w3.org/TR/speech-synthesis11/) or similar types of mark up languages.<br>Contains following attribute:<br>content-type<br>content-enc | anyURI |
| Content-type | A | NM/TM | 0 ... 1 | Content-type of SpeechInfo object referenced by SpeechInfoURI. | String |
| Content-enc | A | NM/TM | 0 ... 1 | Content encoding of SpeechInfo object referenced by SpeechInfoURI. | String |
| SpeechInfo | E2 | NM/TM | 0 ... N | Embedded Speech information object for parent Name element.<br>Contains following attribute:<br>content-type<br>content-enc | anyURI |
| Content-type | A | NM/TM | 0 ... 1 | Content-type of SpeechInfo object. | String |
| Content-enc | A | NM/TM | 0 ... 1 | Content encoding of SpeechInfo object. | String |
| Description | E1 | NM/TM | 0 ... N | Extended Description element which includes sub-elements to indicate description and phonetic information about description. Contains the following elements:<br>Text<br>SpeechInfoURI<br>SpeechInfo | |
| Text | E2 | NM/TM | 1 | Description, possibly in multiple languages. The language is expressed using built-in XML attribute 'xml:lang' with this element. | string |

TABLE 5-continued

Speech Phonetic Information Extensions

| Name | Type | Category | Cardinality | Description | Data Type |
|---|---|---|---|---|---|
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |

Additionally one or more of the following constraints may apply.

When more than one SpeechInfoURI element and SpeechInfo element are present inside a parent Name or Description element in the service guide, the value of content-type attribute of each of the SpeechInfoURI element and SpeechInfo element shall be different.

The semantics of content-type attribute for SpeechInfoURI element and SpeechInfo element shall obey the semantics of Content-Type header of HTTP/1.1 protocol RFC 2616.

When the content-type attribute is not present for SpeechInfoURI element or SpeechInfo element it is inferred to have a value of "application/ssml+xml" for that element.

The semantics of content-enc attribute for SpeechInfoURI element and SpeechInfo element shall obey the semantics of Content-Encoding header of HTTP/1.1 protocol RFC 2616.

When the content-enc attribute is not present for SpeechInfoURI element or SpeechInfo element the associated speech information object for the corresponding SpeechInfoURI element or SpeechInfo is assumed to have no additional content encoding applied.

In another embodiment when the content-enc attribute is not present for SpeechInfoURI element or SpeechInfo element it is inferred to have a value of "identity" for that element.

In another embodiment one or more of the following may apply.

When the content-type attribute is not present for SpeechInfoURI element it is inferred to have a value of "application/ssml+xml" for that element.

When the content-type attribute is not present for SpeechInfo element it is inferred to have a value of "application/ssml+xml" for that element.

In other embodiments instead of "application/ssml+xml" the default value for the content-type attribute when not present may be inferred to be some other value such as either "application/voicexml+xml", or "application/srgs", "application/srgs+xml", "application/ccxml+xml", and "application/pls+xml", or "text/ssml+xml", or some other media type value defined in http://www.iana.org/assignments/media-types/media-types.xhtml or some other value. When the content-enc attribute is not present for SpeechInfoURI element the associated speech information object is assumed to have no additional content encoding applied.

When the content-enc attribute is not present for SpeechInfo element the associated speech information object is assumed to have no additional content encoding applied.

When the content-enc attribute is not present for SpeechInfoURI element it is inferred to have a value of "identity" for that element.

When the content-enc attribute is not present for SpeechInfo element it is inferred to have a value of "identity" for that element.

In one embodiment the speech information could be additionally signaled using elements, sub-elements and attributes as shown in table 6 below.

Elements Name and Description elements from service fragment are extended with addition of sub-elements and attributes related to speech phonetic information, as listed in, as listed in Table 2 Speech Phonetic Information Extensions.

TABLE 6

Speech Phonetic Information Extensions

| Name | Type | Category | Cardinality | Description | Data Type |
|---|---|---|---|---|---|
| Name | E1 | NM/TM | 0 . . . N | Extended Name element which includes sub-elements to indicate name | |

TABLE 6-continued

Speech Phonetic Information Extensions

| Name | Type | Category | Cardinality | Description | Data Type |
|---|---|---|---|---|---|
| | | | | and phonetic information about name. Contains the following elements: Text SpeechInfoURI SpeechInfo | |
| Text | E2 | NM/TM | 1 | Name of the 'Content' fragment, possibly in multiple languages. The language is expressed using built-in XML attribute 'xml:lang' with this element. | string |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |
| Description | E1 | NM/TM | 0 . . . N | Extended Description element which includes sub-elements to indicate description and phonetic information about description. Contains the following elements: Text SpeechInfoURI SpeechInfo | |
| Text | E2 | NM/TM | 1 | Description, possibly in multiple languages. The language is expressed using built-in XML attribute 'xml:lang' with this element. | string |
| SpeechInfoURI | E2 | NM/TM | 0 . . . N | The URI address where SpeechInfo object for parent Name element is acquired. Speech file may be encoded in SSML format (http://www.w3.org/TR/speech-synthesis11/) or similar types of mark up languages. Contains following attribute: content-type content-enc | anyURI |
| Content-type | A | NM/TM | 0 . . . 1 | Content-type of SpeechInfo object referenced by SpeechInfoURI. | String |
| Content-enc | A | NM/TM | 0 . . . 1 | Content encoding of SpeechInfo object referenced by SpeechInfoURI. | String |
| SpeechInfo | E2 | NM/TM | 0 . . . N | Embedded Speech information object for parent Name element. Contains following attribute: content-type content-enc | anyURI |
| Content-type | A | NM/TM | 0 . . . 1 | Content-type of SpeechInfo object. | String |
| Content-enc | A | NM/TM | 0 . . . 1 | Content encoding of SpeechInfo object. | String |

Additionally one or more of the following constraints may apply.

When more than one SpeechInfoURI element and SpeechInfo element are present inside a parent Name or Description element in the service guide, the value of content-type attribute of each of the SpeechInfoURI element and SpeechInfo element shall be different.

The semantics of content-type attribute for SpeechInfoURI element and SpeechInfo element shall obey the semantics of Content-Type header of HTTP/1.1 protocol RFC 2616.

When the content-type attribute is not present for SpeechInfoURI element or SpeechInfo element it is inferred to have a value of "application/ssml+xml" for that element.

The semantics of content-enc attribute for SpeechInfoURI element and SpeechInfo element shall obey the semantics of Content-Encoding header of HTTP/1.1 protocol RFC 2616.

When the content-enc attribute is not present for SpeechInfoURI element or SpeechInfo element the associated speech information object for the corresponding SpeechInfoURI element or SpeechInfo is assumed to have no additional content encoding applied.

In another embodiment when the content-enc attribute is not present for SpeechInfoURI element or SpeechInfo element it is inferred to have a value of "identity" for that element.

In another embodiment one or more of the following may apply.

When the content-type attribute is not present for SpeechInfoURI element it is inferred to have a value of "application/ssml+xml" for that element.

When the content-type attribute is not present for SpeechInfo element it is inferred to have a value of "application/ssml+xml" for that element.

In other embodiments instead of "application/ssml+xml" the default value for the content-type attribute when not present may be inferred to be some other value such as either "application/voicexml+xml", or "application/srgs", "application/srgs+xml", "application/ccxml+xml", and "application/pls+xml", or "text/ssml+xml", or some other media type value defined in http://www.iana.org/assignments/media-types/media-types.xhtml or some other value. When the content-enc attribute is not present for SpeechInfoURI element the associated speech information object is assumed to have no additional content encoding applied.

When the content-enc attribute is not present for SpeechInfo element the associated speech information object is assumed to have no additional content encoding applied. When the content-enc attribute is not present for SpeechInfoURI element it is inferred to have a value of "identity" for that element.

When the content-enc attribute is not present for SpeechInfo element it is inferred to have a value of "identity" for that element.

Figure 11:
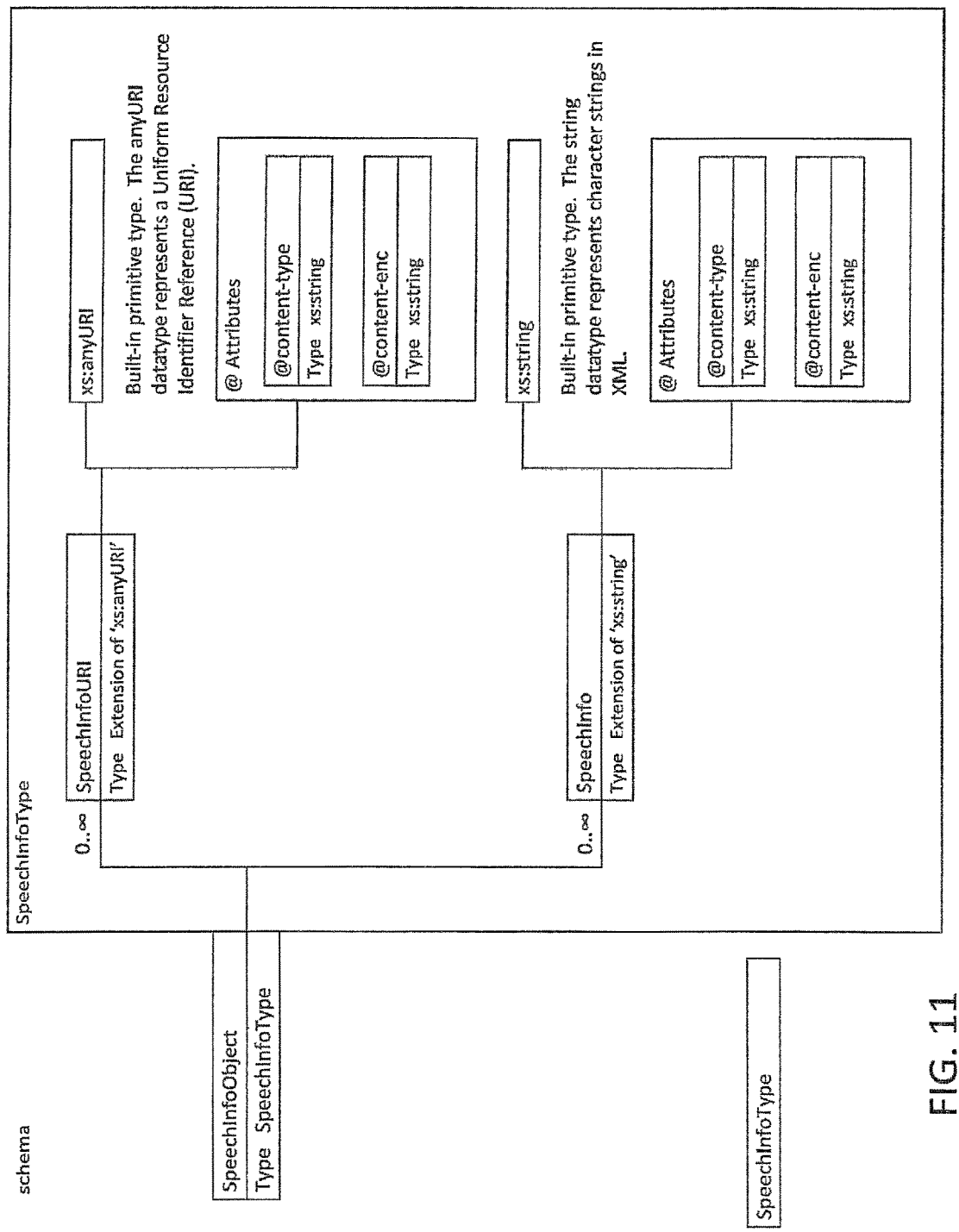
FIG. 11 illustrates structure of an exemplary XML schema.

XML Schema may be used for speech information object signaling. In one embodiment XML schema shown below in "Table: XML schema A" is used. In some cases this may correspond to Table 1 and Table 2. Representation of such an XML schema may be indicated as shown in FIG. 11.

TABLE

XML schema A
List 4

```
<?xml version="1.0" encoding="UTF-8"?>
<xs:schema xmlns:xs="http://www.w3.org/2001/XMLSchema">
    <xs:element name="SpeechInfoObject" type="SpeechInfoType"/>
    <xs:complexType name="SpeechInfoType">
        <xs:sequence>
            <xs:element name="SpeechInfoURI" minOccurs="0"
maxOccurs="unbounded">
                <xs:complexType>
                    <xs:simpleContent>
                        <xs:extension base="xs:anyURI">
                            <xs:attribute name="content-type"
type="xs:string" use="optional"/>
                            <xs:attribute name="content-enc"
type="xs:string" use="optional"/>
                        </xs:extension>
                    </xs:simpleContent>
                </xs:complexType>
            </xs:element>
```

TABLE-continued

XML schema A
List 4

```
            <xs:element name="SpeechInfo" minOccurs="0"
maxOccurs="unbounded">
                <xs:complexType>
                    <xs:simpleContent>
                        <xs:extension base="xs:string">
                            <xs:attribute name="content-type"
type="xs:string" use="optional"/>
                            <xs:attribute name="content-enc"
type="xs:string" use="optional"/>
                        </xs:extension>
                    </xs:simpleContent>
                </xs:complexType>
            </xs:element>
        </xs:sequence>
    </xs:complexType>
</xs:schema>
```

In an alternative embodiment some of the use='optional' may be changed to use='required'.

Figure 12:
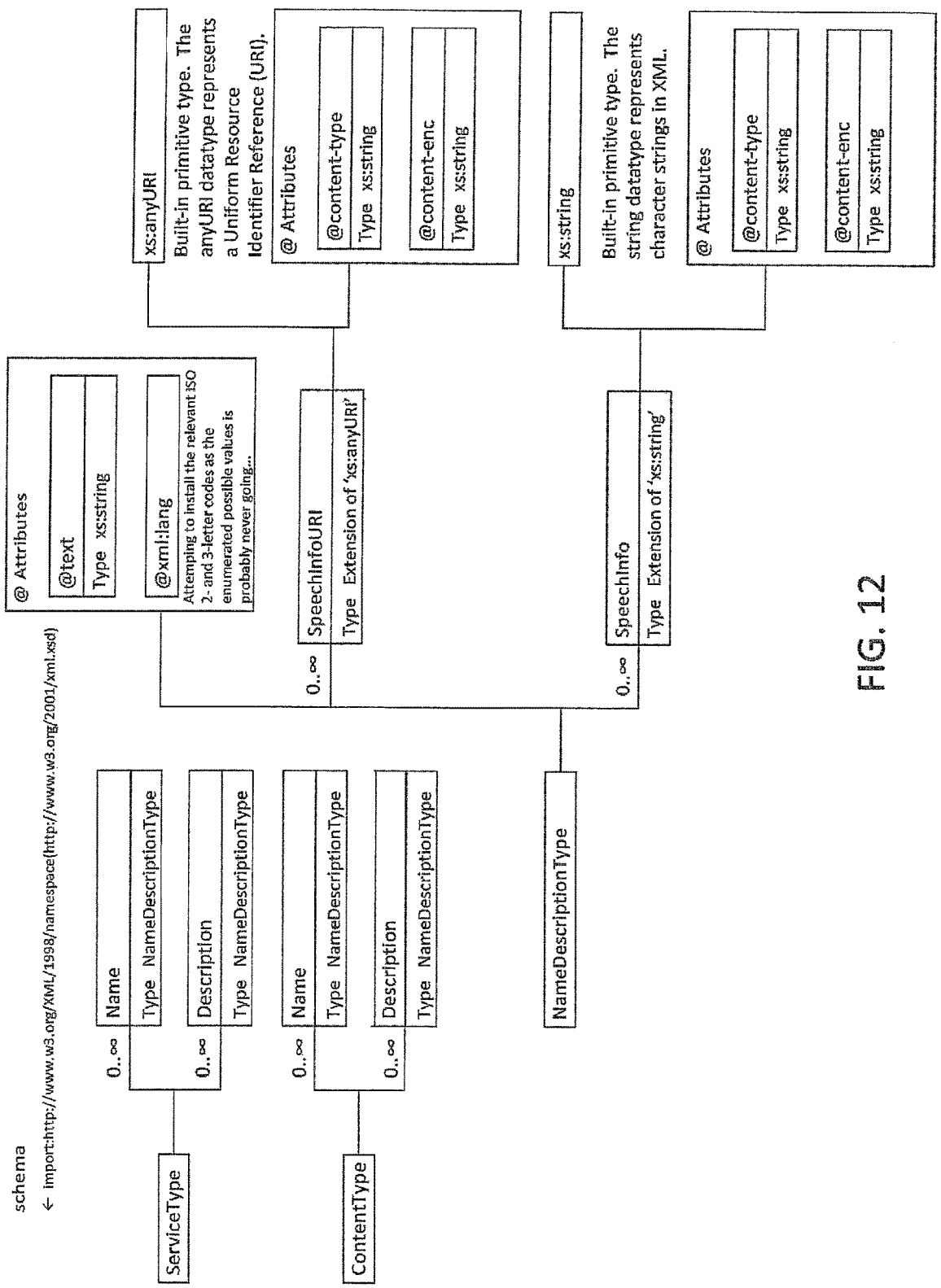
FIG. 12 illustrates structure of an exemplary XML schema.

In an alternative embodiment XML schema shown below in "Table: XML schema B" is used. In some cases this may correspond to Table 3 and Table 4. Representation of such an XML schema may be indicated as shown in FIG. 12.

TABLE

XML schema B

List 5-1

```
<?xml version="1.0" encoding="UTF-8"?>
<xs:schema xmlns:xs="http://www.w3.org/2001/XMLSchema">
<xs:import namespace="http://www.w3.org/XML/1998/namespace"
schemaLocation="http://www.w3.org/2001/xml.xsd"/>
<xs:complexType name="ServiceType">
    <xs:sequence>
        <xs:element name="Name" type="NameDescriptionType"
minOccurs="0" maxOccurs="unbounded"/>
        <xs:element name="Description"
type="NameDescriptionType" minOccurs="0"
maxOccurs="unbounded"/>
    </xs:sequence>
</xs:complexType>
<xs:complexType name="ContentType">
    <xs:sequence>
        <xs:element name="Name" type="NameDescriptionType"
minOccurs="0" maxOccurs="unbounded"/>
        <xs:element name="Description"
type="NameDescriptionType" minOccurs="0"
maxOccurs="unbounded"/>
    </xs:sequence>
</xs:complexType>
```

List 5-2

```
<xs:complexType name="NameDescriptionType">
    <xs:sequence>
        <xs:element name="SpeechInfoURI" minOccurs="0"
maxOccurs="unbounded">
            <xs:complexType>
                <xs:simpleContent>
                    <xs:extension base="xs:anyURI">
                        <xs:attribute name="content-type"
type="xs:string" use="optional"/>
                        <xs:attribute name="content-enc"
type="xs:string" use="optional"/>
                    </xs:extension>
                </xs:simpleContent>
            </xs:complexType>
        </xs:element>
        <xs:element name="SpeechInfo" minOccurs="0"
maxOccurs="unbounded">
            <xs:complexType>
                <xs:simpleContent>
                    <xs:extension base="xs:string">
```

| TABLE-continued |
|---|
| XML schema B |
|                                                                                                                                                                                                                                              |

```
                <xs:attribute name="content-type"
type="xs:string" use="optional"/>
                <xs:attribute name="content-enc"
type="xs:string" use="optional"/>
            </xs:extension>
          </xs:simpleContent>
        </xs:complexType>
      </xs:element>
    </xs:sequence>
    <xs:attribute name="text" type="xs:string" use="required" />
    <xs:attribute ref="xml:lang" use="optional"/>
  </xs:complexType>
</xs:schema>
```

Figure 13:
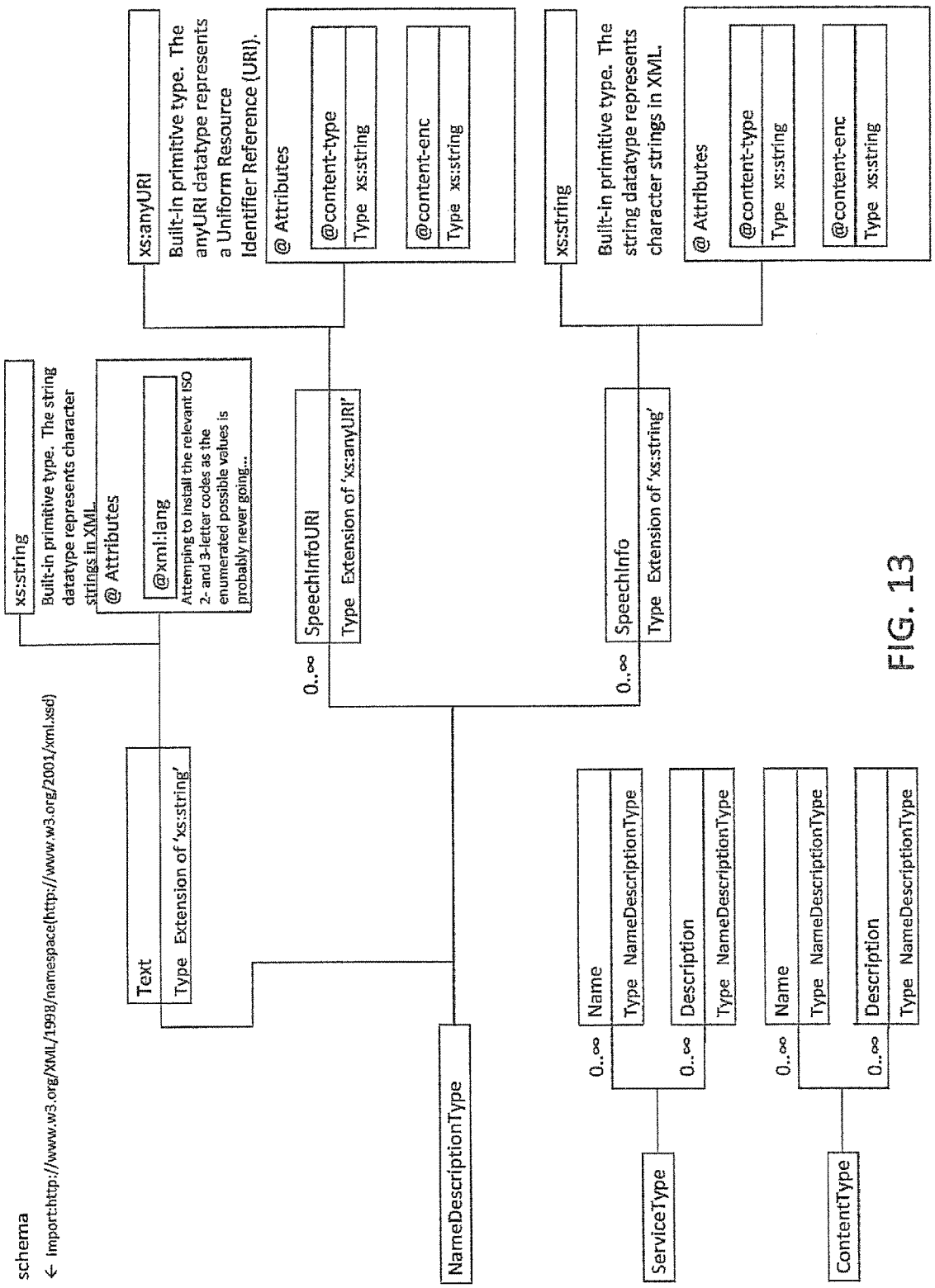
FIG. 13 illustrates structure of an exemplary XML schema.

In an alternative embodiment XML schema shown below in "Table: XML schema C" is used. In some cases this may correspond to Table 5 and Table 6. Representation of such an XML schema may be indicated as shown in FIG. 13.

| TABLE |
|---|
| XML schema C |
| List 6-1 |

```
<?xml version="1.0" encoding="UTF-8"?>
<xs:schema xmlns:xs="http://www.w3.org/2001/XMLSchema">
<xs:import namespace="http://www.w3.org/XML/1998/namespace"
schemaLocation="http://www.w3.org/2001/xml.xsd"/>
<xs:complexType name="ServiceType">
        <xs:sequence>
            <xs:element name="Name" type="NameDescriptionType"
minOccurs="0" maxOccurs="unbounded"/>
            <xs:element name="Description"
type="NameDescriptionType" minOccurs="0"
maxOccurs="unbounded"/>
        </xs:sequence>
</xs:complexType>
<xs:complexType name="ContentType">
        <xs:sequence>
            <xs:element name="Name" type="NameDescriptionType"
minOccurs="0" maxOccurs="unbounded"/>
            <xs:element name="Description"
type="NameDescriptionType" minOccurs="0"
maxOccurs="unbounded"/>
        </xs:sequence>
</xs:complexType>
```

| List 6-2 |
|---|

```
    <xs:complexType name="NameDescriptionType">
        <xs:sequence>
            <xs:element name="Text">
                <xs:complexType>
                    <xs:simpleContent>
                        <xs:extension base="xs:string">
                            <xs:attribute ref="xml:lang"
                              use="optional"/>
                        </xs:extension>
                    </xs:simpleContent>
                </xs:complexType>
            </xs:element>
            <xs:element name="SpeechInfoURI" minOccurs="0"
maxOccurs="unbounded">
                <xs:complexType>
                    <xs:simpleContent>
                        <xs:extension base="xs:anyURI">
                            <xs:attribute name="content-type"
type="xs:string" use="optional"/>
                            <xs:attribute name="content-enc"
type="xs:string" use="optional"/>
                        </xs:extension>
                    </xs:simpleContent>
                </xs:complexType>
            </xs:element>
```

| TABLE-continued |
|---|
| XML schema C |

```
            <xs:element name="SpeechInfo" minOccurs="0"
maxOccurs="unbounded">
                <xs:complexType>
                    <xs:simpleContent>
                        <xs:extension base="xs:string">
                            <xs:attribute name="content-type"
type="xs:string" use="optional"/>
                            <xs:attribute name="content-enc"
type="xs:string" use="optional"/>
                        </xs:extension>
                    </xs:simpleContent>
                </xs:complexType>
            </xs:element>
        </xs:sequence>
    </xs:complexType>
</xs:schema>
```

In yet another embodiment <!-- Name and Description elements in Service and Content Fragments of OMA BCAST service guide will be replaced with following extended elements-->
<xs:element name="Name" type="NameDescriptionType" minOccurs="0" maxOccurs="unbounded"/>
<xs:element name="Description" type="NameDescription-Type" minOccurs="0" maxOccurs="unbounded"/>

In some embodiments some of the elements above may be changed from E2 to E1.

In some embodiments the cardinality of some of the elements may be changed. For example cardinality may be changed from "1" to "1 . . . N" or cardinality may be changed from "1" to "0 . . . N" or cardinality may be changed from "1" to "0 . . . 1" or cardinality may be changed from "0 . . . 1" to "0 . . . N" or cardinality may be changed from "0 . . . N" to "0 . . . 1".

In some embodiments some of the elements could instead be signalled as attributes.

In some embodiments some of the attributes could instead be signalled as elements.

In another embodiments some of the "NM/TM" values in the "category" may be changed to "NM/TO" or "NO/TM" or "NO/TO".

In some embodiments instead of XML some other format e.g. JSON/CSV/BNF/ABNF/EBNF may be used for representing the same information conveyed in the XML format.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding a service guide associated with a video bitstream comprising:
 (a) receiving a content fragment within the service guide;
 (b) receiving a name element within the content fragment, wherein the name element is an extended name element which includes first sub-elements to indicate name and phonetic information about the name element;
 (c) receiving a SpeechInfoURI element and a SpeechInfo element within the name element;
 (d) receiving a first content type attribute within the SpeechInfoURI element and a second content type attribute within the SpeechInfo element, wherein a value of the first content type attribute and a value of the second content type attribute are different; and (e) decoding the service guide.

\* \* \* \* \*